United States Patent
Kamoda

(10) Patent No.: US 6,814,325 B2
(45) Date of Patent: Nov. 9, 2004

(54) FILM-WINDING DEVICE FOR CAMERA

(75) Inventor: Takashi Kamoda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 67 days.

(21) Appl. No.: 10/084,959

(22) Filed: Mar. 1, 2002

(65) Prior Publication Data

US 2002/0121567 A1 Sep. 5, 2002

(30) Foreign Application Priority Data

Mar. 2, 2001 (JP) ........................................ 2001-057789

(51) Int. Cl.$^7$ ........................... B65H 23/00; G03B 1/56; F16F 1/18
(52) U.S. Cl. .................... 242/332.7; 242/548; 396/415; 267/163
(58) Field of Search ............................. 242/332, 332.7, 242/358, 358.1, 548, 615, 615.2, 615.4; 396/440, 411, 415, 535, 538; 267/163, 164, 165

(56) References Cited

U.S. PATENT DOCUMENTS

| | | | | |
|---|---|---|---|---|
| 3,130,990 A | * | 4/1964 | Leitmann | 403/357 |
| 3,567,147 A | * | 3/1971 | Engelsmann et al. | 242/332.7 |
| 4,397,535 A | * | 8/1983 | Harvey | 396/396 |
| 4,624,592 A | * | 11/1986 | Purcell | 400/208 |
| 5,275,347 A | * | 1/1994 | Keeney et al. | 242/348.1 |
| 5,459,543 A | * | 10/1995 | Suzuki et al. | 396/440 |
| 6,006,044 A | | 12/1999 | Okuno | |

FOREIGN PATENT DOCUMENTS

| JP | 09-203943 | 8/1997 |
|---|---|---|
| JP | 09-222648 | 8/1997 |

* cited by examiner

Primary Examiner—Kathy Matecki
Assistant Examiner—Scott J. Haugland
(74) Attorney, Agent, or Firm—Young & Thompson

(57) ABSTRACT

There is a film-press spring for pressing a photographic film on a take-up spool in a take-up chamber. The film-press spring has a main body for guiding a leading end of the photographic film at the beginning of the film winding and a plate bended in U-shape against the main body. A pressing arm which is protruded from the main body presses the photographic film to a periphery of the take-up spool. And a fitting arm which is elastic enough to be transformed is protruded from the plate. When inserted into the spring attachment hollow of the take-up chamber, the fitting arm presses the wall surface of the spring attachment hollow. And a slipping prevention claw of the plate is engaged with the wall surface of the spring attachment hollow.

10 Claims, 4 Drawing Sheets

FILM-WINDING DEVICE FOR CAMERA

BACKGROUND OF THE INVENTION

1. Field of the Invention

The present invention relates to a film-winding device for camera, more particularly to a film-winding device with a film-press spring for pressing a photographic film on a take-up spool.

2. Description of the Prior Arts

A film cartridge of IX 240 type (it will be mentioned as a film cartridge in the following) has been widely on sale. The film cartridge consists of a photographic film and a plastic cartridge to contain the photographic film entirely. The cartridge consists of a cartridge spool that winds the photographic film and a housing that contains the cartridge spool in a rotatable manner.

A spool drive shaft is rotatably protruded in a cartridge chamber. When the film cartridge is loaded into the cartridge chamber, the spool drive shaft connects to the cartridge spool. When the cartridge spool is rotated by the spool drive shaft, the photographic film is advanced from the cartridge. A film passage path is formed between the cartridge chamber and the take-up chamber. The photographic film, passing trough the film passage path, is advanced from the cartridge chamber to the take-up chamber frame by frame. An exposure aperture is formed in the middle of the film passage for determining a exposure determining an exposure area of the photographic film.

In the take-up chamber, there are disposed a take-up spool for rolling a photographic film and a film-press spring for pressing the photographic film on the take-up spool. The film-press spring is fixed into the take-up chamber by a screw, caulking, and the forth. According to the camera disclosed in Japanese Patent Laid-open Publication No. 9-222648 (corresponding to U.S. Pat. No. 6,006,044), the film-press spring is pressed onto a groove in order to be fixed. The photographic film into the take-up chamber is pressed to the take-up spool by the film-press spring to advance along the surroundings of the take-up spool. The photographic film is advanced further, the leading end of the photographic film is inserted between a part of the photographic film, which is pressed by the press spring and the surroundings of the take-up spool. After that, owing to the frictional force by a slip prevention member formed around the take-up spool, the photographic film is wound around the take-up spool in a coil.

However, the method to fix the film-press spring by use of screws, caulking, and the like decreases work performance upon attachment and increases the step of work because a space of the take-up chamber is narrow. As a result, the manufacturing cost goes up. Likewise, the method to press the film-press spring into a groove is good in work performance upon attachment. But it also has disadvantage that it is easily come off from the groove because the film-press spring is urged to the extracting direction at all times upon rolling the film.

SUMMARY OF THE INVENTION

In view of the foregoing, a primary object of the present invention is to provide a film-winding device whose work performance is good upon attachment of a film-press spring.

Another object of the present invention is to provide a film-winding device in which a film-press spring is fastened without fail.

And final object of the present invention is to provide a film-winding device that realizes reduction in costs by reducing the step of work.

In order to achieve the above and other objects, the film-winding device of the present invention is provided with a film-press spring disposed in a take-up chamber and a spring attachment hollow for holding the film-press spring. The film-press spring has a support section that is elastic and transformable in order to be inserted into the spring attachment hollow. A fitting arm and a slip prevention claw are integrally formed in the support section. The fitting arm presses a wall surface of the spring attachment hollow so as to hold the film-press spring. The slip prevention claw is engaged with the wall surface of the attachment hollow to prevent the film-press spring from being slipped. The slip prevention claw is engaged to the side wall surface of the spring attachment hollow or the end wall surface that crosses with the side wall surface.

According to the film-winding device of the present invention, inserting the support section of the film-press spring into the spring attachment hollow leads to a decrease in work step and simplification of an attachment operation because the film-press spring is fixed to the take-up chamber. In addition to that, since the slip prevention claw is engaged with the wall surface of the spring attachment hollow as well as the fitting arm presses the wall surface of the spring attachment hollow, the film-press spring is surely fastened.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
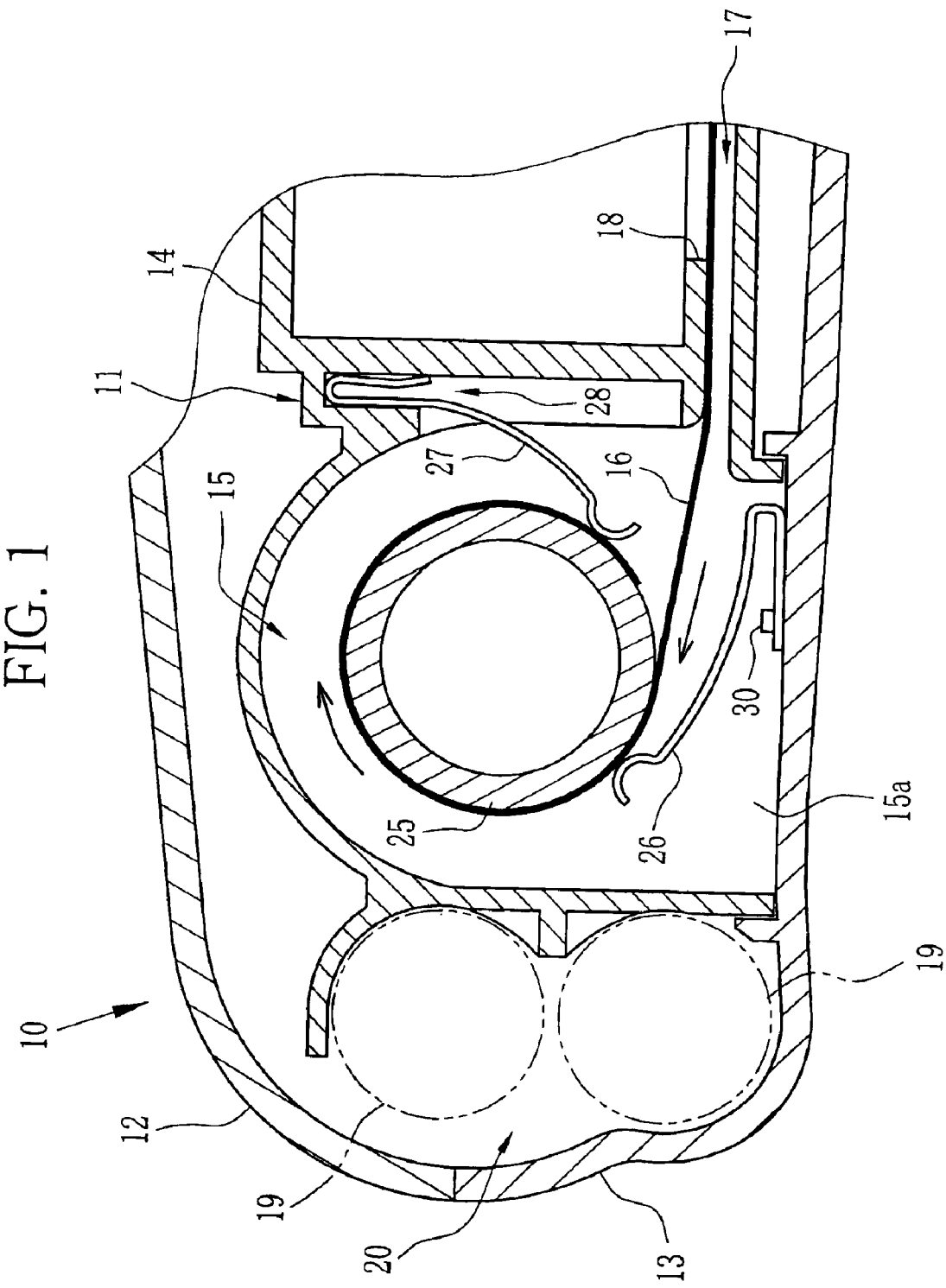
FIG. 1 is a sectional view illustrating a part of a take-up chamber of a camera that is embodied in the present invention.
Figure 2:
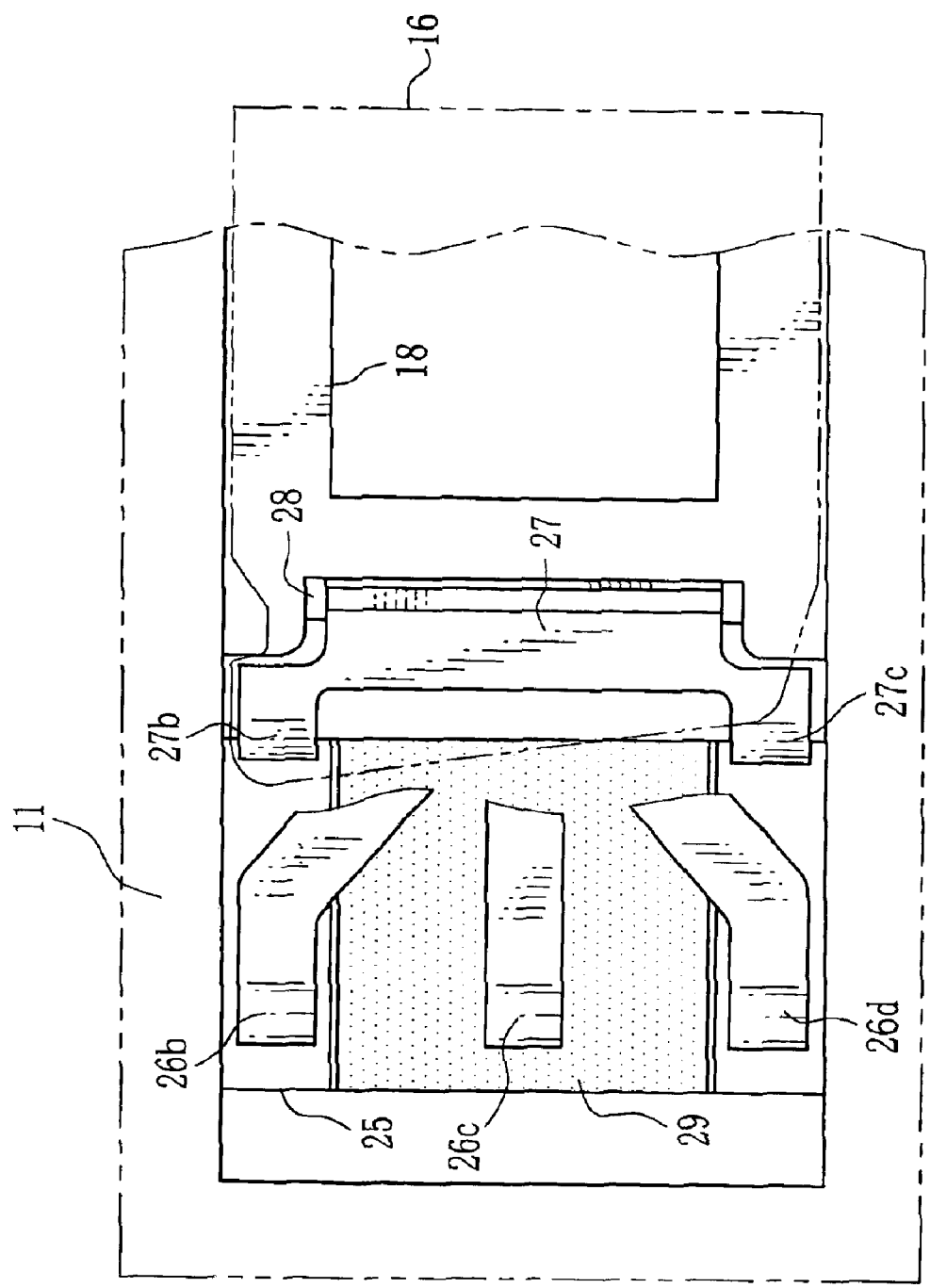
FIG. 2 is a rear view of a take-up chamber.

In FIGS. 1 and 2, a camera 10 consists of a camera body 11 into which a film advance mechanism and several taking mechanisms are incorporated, a front cover 12 and a rear cover 13 to be attached to the camera body from backward and forward.

A dark tunnel 14 into which a taking optical system and a shutter mechanism (neither of them is shown) are incorporated is positioned at the nearly center of the camera body 11. A cartridge chamber (not shown) and a take-up chamber 15 are respectively positioned at both sides of the dark tunnel 14. A film passage path 17 for conveying a photographic film 16 is formed between the cartridge chamber and the take-up chamber 15, and at the rear of the dark tunnel 14.

There is an exposure aperture 18 for determining an exposure area in the film passage path 17. There is a battery chamber 20 between each cover 12, 13 and the camera body 11. And a battery for supplying electricity to each electric circuit is contained into the battery chamber 20.

As is well known, a spool drive shaft (not shown) is protruded in the cartridge chamber, into which a well-known IX-240 type film cartridge (not shown) is loaded. When the cartridge lid (not shown) is closed, the spool drive shaft makes rotation. Since the spool drive shaft is connected to the cartridge spool, the photographic film 16 rolled around the cartridge spool is advanced from the cartridge. The leading end of the photographic film 16, passing through the film passage path 17, enters the take-up chamber 15.

An opening 15a is formed at the rear of the take-up chamber 15 and it is closed by the rear cover 13 light-tightly. The take-up chamber 15 has a take-up spool 25 for winding the photographic film 16, and a first and a second film-press springs 26, 27 for pressing the photographic film 16 on the take-up spool 25. The first film-press spring 26 is fixed to the rear cover 13 by a screw 30. A spring attachment hollow 28 is made in a wall that forms the take-up chamber 15 so as to adjoin the take-up chamber 15. The second film-press spring 27 is fixed to the wall of the take-up chamber 15 by inserting the second film-press spring 27 into the spring attachment hollow 28.

The take-up spool 25, which is made from resin and in cylindrical form, is rotatably mounted in the take-up chamber 15. A motor (not shown) is contained in the take-up spool 25 for advancing and rewinding the photographic film 16. A rubber tube 29 to prevent slipping is covered at the central part of a periphery of the take-up spool 25, so as to cause suitable friction with the photographic film 16. The part on which the rubber tube 29 of the winding shaft 25 is covered is reduced for the thickness of the rubber tube 29 in diameter, so as not to cause a difference in level between a surrounding part on which the rubber tube 29 is uncovered and an exterior surface of the rubber tube 29.

Figure 3:
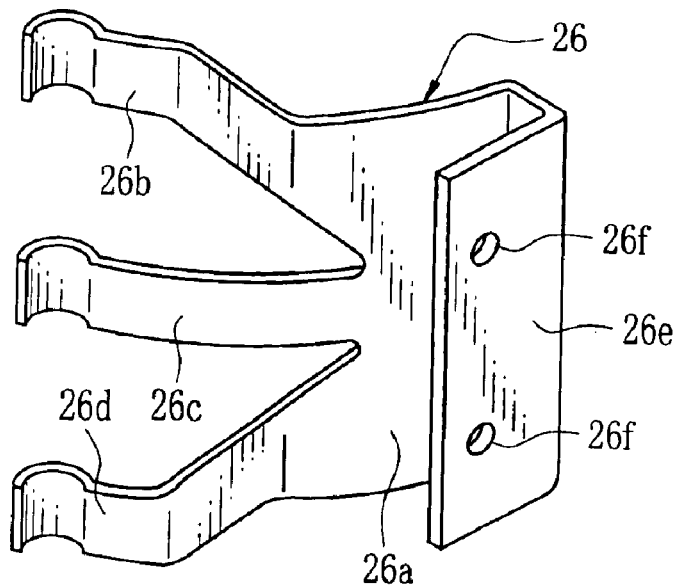
FIG. 3 is a perspective view illustrating structure of a first film-press spring.

The first and the second film-press springs 26, 27 are made integrally from metal materials having elastic properties. The first film-press spring 26 is, as shown in FIG. 3, constituted of a main body 26a, pressing arms 26b, 26c, 26d, and a plate 26e. Through holes 26f in the plate 26e, the first film-press spring 26 is fixed to the rear cover 13 by the screw 30. And tips of the pressing arm 26b–26d respectively press the photographic film 16 to the external diameter of the take-up spool 25.

Tips of the respective pressing arms 26b–26d, more particularly, the surfaces to contact with the photographic film 16 take the projected arc form so as not to give scratches to the photographic film 16. The pressing arm 26c presses the roughly central part of the photographic film 16 on the rubber tube 29. As the picture frame is formed at the center of the photographic film 16, the pressing arm 26c presses the photographic film 16 with small force for not giving scratches thereon. Meanwhile another pressing arms 26b, 26d press both edges of the photographic film 16 and outside parts of the picture frame on the take-up spool 25 with large force.

Figure 4:
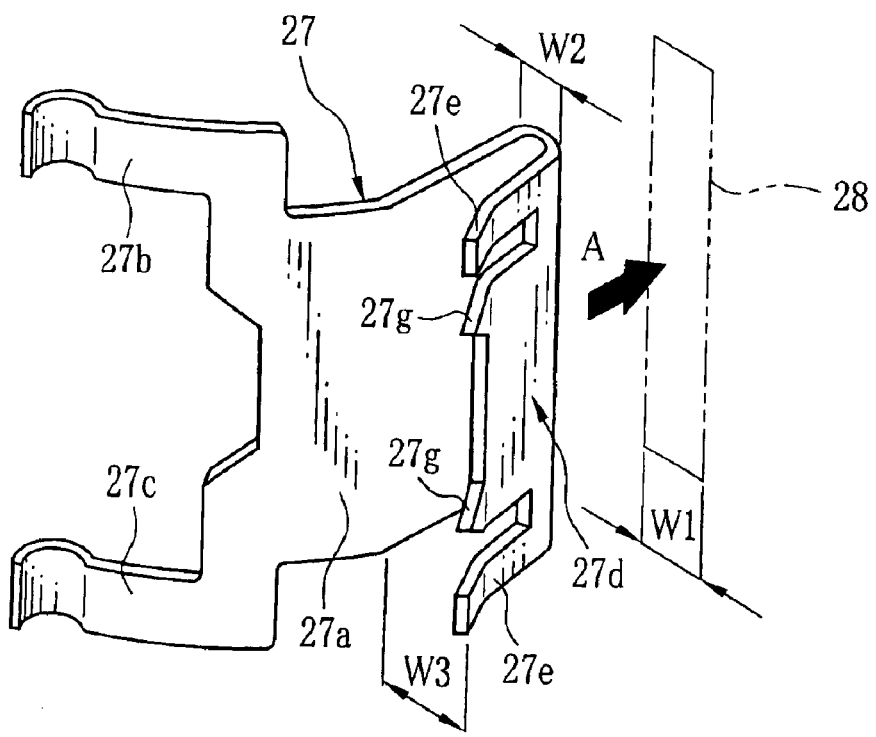
FIG. 4 is a perspective view illustrating structure of a second film-press spring.

The second film-press spring 27 is positioned so as to press the photographic film 16 to the take-up spool 25 just before the photographic film 16 is rolled around the take-up spool 25. As shown in FIG. 4, the second film-press spring 27 consists of a main body 27a, pressing arms 27b, 27c, a plate 27d, fitting arms 27e, and slip prevention claws 27g. A part of the main body 27a is bent to U-shape so as to form the plate 27d. Two fitting arms 27e and two slip prevention claws 27g are protruded from the plate 27d. The tips of the fitting arm 27e and the slip prevention claw 27g are bent so as to spread away from the main body 27a, so that they contact with the side wall surfaces of the spring attachment hollow 28 at suitable angles.

The U-shaped point portion that is constituted of the main body 27a and the plate 27d is W2 in width. W2 is slightly narrower than W1, the width of the spring attachment hollow 28. Therefore the U-shaped section can be inserted into the spring attachment hollow 28 smoothly. It is possible that the width of the edge portion of the plate 27d (the part close to the slip prevention claw 27g) is equalized or a bit larger than the width W1.

Figure 5:
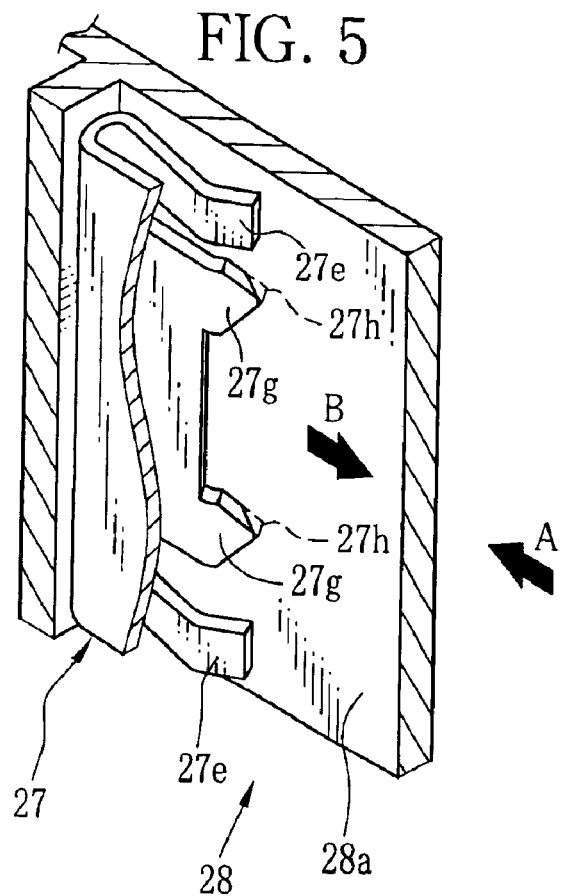
FIG. 5 is a perspective view with a second film-press spring attached.

An external width between the fitting arm 27e and the main body 27a is W3. When the U-shaped section is pressed to enter into the spring attachment hollow 28, as shown in FIG. 5, the plate 27d is elastically transformed, as the external width W3 is wider than W1, the width of the spring attachment hollow 28. Force of repulsion by this elastic transformation causes the tip of the fitting arms 27e and the slip prevention claws 27g to engage with the wall surface of the spring attachment hollow 28, so that the second film-press spring 27 is pressed to enter into the spring attachment hollow 28. In this way, the second film-press spring 27 is held in the spring attachment hollow 28. And the tips of the pressing arms 27b, 27c press the photographic film 16 towards the take-up spool 25.

When the take-up spool 25 rolls the photographic film 16, the second film-press spring 27 is urged to an extracting direction (direction of an arrow B) contrary to an inserting direction into the spring attachment hollow 28. When the second film-press spring 27 attempts to move to the extracting direction, however, a tip 27h of the slip prevention claw 27g (See FIG. 5) cuts into a side wall surface 28a to stop the movement. Therefore, it is not likely that the second film-press spring 27 will slip out from the spring attachment hollow 28. In conclusion, the second film-press spring 27 is easily fixed by inserting it into the spring attachment hollow 28, besides it is unlikely to slip out in spite of the bias to the extracting direction.

Each the fitting arms 27b, 27c presses the outside of a photographed image frame of the photographic film 16 on the take-up spool 25 with large force. However, since the tips of the pressing arms 27b, 27c are formed as arc-shaped projections like the above first film-press spring 26, there is no possibility to have scratches on the photographic film 16.

The urged force of each film-press spring 26, 27 can be altered suitably by varying widths, thickness, and bending angles of each pressing arms 26b, 26c, 26d, 27b, 27c. And the tip projections of each pressing arms 26b, 26c, 26d, 27b, 27c are made larger than the perforations of the photographic film 16, so as to keep them away from entering into the perforations.

The function of the above structure will be explained. In the manufacturing process of the camera 10, the take-up spool 25 is mounted in the take-up chamber 15, then the plate 27d is pressed into the spring attachment hollow 28 in order to attach the second film-press spring 27. The first film-press spring 26 is fixed to the rear cover 13 by the screw 30 in advance. The rear cover 13 and the front cover 12 are respectively covered to the camera body 11 from forward and backward.

A film cartridge is loaded into the cartridge chamber before using the camera 10. The cartridge spool is connected to the spool drive shaft in the cartridge chamber. When the cartridge door is closed, a motor in the take-up spool 25 is rotated automatically. The rotation is transmitted to the spool drive shaft via the transmission mechanism. When the cartridge spool is rotated by the spool drive shaft, the leading end of the photographic film 16 is advanced from the cartridge. The leading end of the photographic film 16 enters the take-up chamber 15 through the film passage path 17.

The photographic film 16 is guided toward the take-up spool 25 by the first film-press spring 26 and pressed on the take-up spool 25 by the tip of the first film-press spring 26. The pressing arms 26b, 26d, being intensified its urged force of the spring, press the both edges of the photographic film 16 on the take-up spool 25. Meanwhile, the pressing arm 26c, being weakened its urged force, does not give scratches to the photographic film 16 although it presses the center area of the photographing film 16 to be recorded on the rubber tube 29.

When the photographic film 16 is given conveyance force from the take-up spool 25 owing to the friction of the rubber tube 29, it passes through the first film-press spring 26. After that, the leading end of the photographic film 16 strikes on the inner wall of the take-up chamber 15, then advances along the second film-press spring 27. Being guided by the main body 27a of the second film-press spring 27, the photographic film 16 moves to the periphery of the take-up spool 25. And the both edges of the photographic film 16 are pressed to the periphery of the take-up spool 25 by the pressing arms 27b, 27c. Although the second film-press spring 27 is urged in the extracting direction at that time, there is no possibility of slipping out, as the tip 27h of the slip prevention claw 27g is cut into the side wall surface 28a of the spring attachment hollow 28. When the take-up spool 25 makes rotation further, the leading end of the photographic film 16 enters between the part of the photographic film 16 that is subsequently conveyed and the take-up spool 25. After the photographic film 16 is coiled around the take-up spool 25 for one round, the photographic film 16 is tightly rolled around the take-up spool 25 due to friction produced by the rubber tube 29. During the winding operation, the pressing arms 27b, 27c of the second film-press spring 27 press the both edges of the photographic film 16 on the periphery of the take-up spool 25.

When the area of the first picture frame is set behind the exposure aperture, the motor is stopped to finish winding the film. Operating the shutter button to form an image on the first picture frame, the motor makes an automatic rotation to set the area of the second picture frame behind the exposure aperture. When all picture frame areas are exposed, the motor makes a reverse rotation. The exposed photographic film 16 rolled around the take-up spool 25 is completely rewound into the cartridge.

Figure 6:
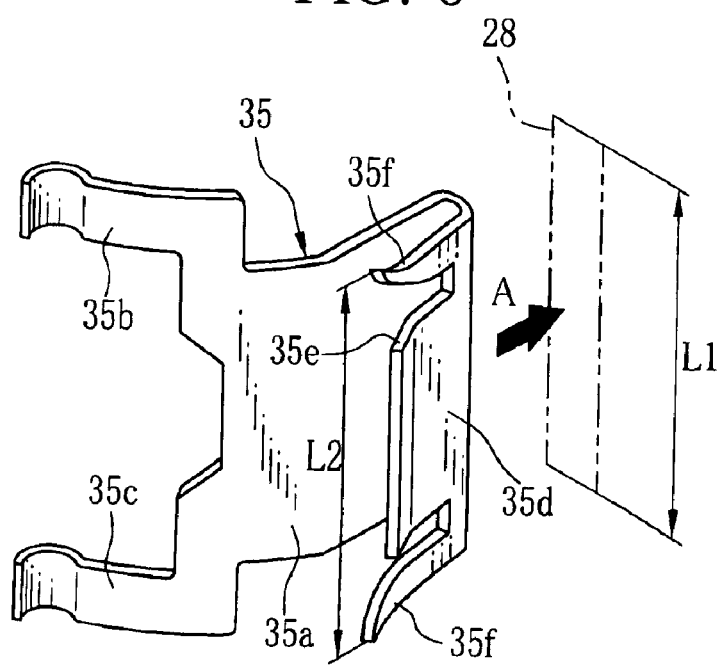
FIG. 6 is a perspective view illustrating another embodiment of a second film-press spring.

As shown in FIG. 6, it is also suitable to form a slip prevention claw 35f on the upper and lower edges of the plate 27d, to cause the slip prevention claw 35f to cut into the upper and lower edge wall surfaces of the spring attachment hollow 28. In this case, the length L2 between tips of the slip prevention claws 35f is lengthened more than the length L1 of the spring attachment hollow 28, together with making the slip prevention claw 35f elastically transformable in a direction of rotary shaft of the take-up spool 25.

According to the above embodiment, the first film-press spring is fixed to the rear cover by the screw. However, it is also suitable that a spring attachment hollow is positioned in the rear cover too, so that the first film-press spring is pressed in order to be fixed, just as fixing the second film-press spring. Moreover, the present invention is applicable to another kinds of photographic roll film such as a 135 type and the like too, as well as the film cartridge of IX 240 type. Further, in addition to metal materials like iron, stainless and so forth, the first and second film-press springs can be made from high polymer and the like such as plastics. And finally, it is possible to provide free rollers on the tip of the film-press spring in place of arc-shaped projections.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A film-winding device for camera for winding a photographic film around a take-up spool in a take-up chamber comprising:

a spring attachment hollow formed in a wall of said take-up chamber;

a film-press spring being positioned in said take-up chamber, said film-press spring having a main body for guiding a leading end of said photographic film at a commencement of said film winding, and a plate bent in U-shape against said main body;

a pressing arm being projected from said main body for pressing said photographic film around said take-up spool;

a plurality of fitting arms being protruded from said plate so as to be transformable elastically, each of said plurality of fitting arms having a free end pressing a first wall surface of said spring attachment hollow when said plate inserts into said spring attachment hollow; and at least one slip prevention claw formed in said plate, said at least one prevention claw engaged to said first wall surface of said spring attachment hollow so as to prevent said plate from slipping from said spring attachment hollow.

2. A film-winding device for camera as claimed in claim 1 wherein a portion of said plate where said plate is bent in U-shape has a width that is a bit smaller than a width of said spring attachment hollow;

said fitting arm extending away from the U-shape so that a width of the plate at a distal end of said fitting arm is larger than a width of said spring attachment hollow.

3. A film-winding device for camera as claimed in claim 2 wherein said main body, said pressing arm, said plate, said fitting arm, and said slip prevention claw are integrally formed.

4. A film-winding device for camera as claimed in claim 3 wherein said slip prevention claw is widened in a separating direction from said main body, said slip prevention claw being engaged to a side wall surface of said spring attachment hollow with said fitting arm.

5. A film-winding device for camera as claimed in claim 3 comprising a plurality of said slip prevention claws arranged at opposite edges of the plate, each of said slip prevention claws being engaged to a respective edge wall surface of said spring attachment hollow adjacent the first wall.

6. The film-winding device of claim 1, wherein the at least one claw includes two said claws, each of the claws engaging the first wall of the spring attachment hollow.

7. The film-winding device of claim 6, wherein both of the two claws are arranged between two of the fitting arms.

8. A film-winding device for camera, for winding a photographic film around a take-up spool in a take-up chamber comprising:

- a film-press spring disposed in said take-up chamber, said film-press spring having a tip section for pressing said photographic film towards said take-up spool, and an end section for fixing said film-press spring to a wall of said take-up chamber;
- a spring attachment hollow positioned in said wall of said take-up chamber; and
- a support section formed in said end section of said film-press spring so as to be elastically transformable, said support section comprising two slots extending inward from an end of the support section, the two slots dividing the end of the support section into three arms, an outer two of the three arms terminating in slip prevention claws, an inner one of the three arms being a fitting arm, the slip prevention claws being arranged to engage said wall surface of said spring attachment hollow for preventing said film-press spring from slipping out from said spring attachment hollow.

9. The film-winding device of claim 8, wherein the fitting arm is positioned to make contact with a first wall of the spring attachment hollow, each of the slip prevention claws being arranged to engage a respective one of second and third walls of the spring attachment hollow.

10. The film-winding device of claim 9, wherein the second and third walls of the spring attachment hollow are parallel to one another, and each of the second and third walls is generally orthogonal to the first wall.

* * * * *